United States Patent
Speer et al.

(10) Patent No.: US 9,514,054 B2
(45) Date of Patent: Dec. 6, 2016

(54) METHOD TO PERSISTENT INVALIDATION TO ENSURE CACHE DURABILITY

(71) Applicant: NetApp, Inc., Sunnyvale, CA (US)

(72) Inventors: Kenny Speer, Danville, CA (US); Narayan Venkat, Westford, MA (US); David Lively, Hudson, MA (US)

(73) Assignee: NetApp, Inc., Sunnyvale, CA (US)

(*) Notice: Subject to any disclaimer, the term of this patent is extended or adjusted under 35 U.S.C. 154(b) by 224 days.

(21) Appl. No.: 14/326,210

(22) Filed: Jul. 8, 2014

(65) Prior Publication Data
US 2016/0011984 A1 Jan. 14, 2016

(51) Int. Cl.
*G06F 12/08* (2016.01)
*G06F 3/06* (2006.01)

(52) U.S. Cl.
CPC ........... *G06F 12/0891* (2013.01); *G06F 3/064* (2013.01); *G06F 3/067* (2013.01); *G06F 3/0619* (2013.01); *G06F 3/0652* (2013.01); *G06F 12/0815* (2013.01); *G06F 2003/0691* (2013.01); *G06F 2212/1032* (2013.01); *G06F 2212/152* (2013.01); *G06F 2212/154* (2013.01); *G06F 2212/163* (2013.01); *G06F 2212/214* (2013.01); *G06F 2212/222* (2013.01); *G06F 2212/261* (2013.01); *G06F 2212/264* (2013.01); *G06F 2212/281* (2013.01); *G06F 2212/311* (2013.01)

(58) Field of Classification Search
CPC .............. G06F 11/1441; G06F 11/1446; G06F 11/1448; G06F 12/0238; G06F 12/0871; G06F 2212/1016; G06F 2212/217; G06F 2212/305; G06F 3/061; G06F 2003/0691; G06F 2009/45579; G06F 2212/163; G06F 2212/2022; G06F 2212/262; G06F 2212/466

USPC .......... 711/E12.001, 103, E12.008, 102, 154,711/114, 162, 141, 159, E12.022, E12.026, 104,711/143, 166
See application file for complete search history.

(56) References Cited

U.S. PATENT DOCUMENTS

| | | |
|---|---|---|
| 7,613,815 B1 | 11/2009 | Prakash et al. |
| 8,407,403 B2 | 3/2013 | Prabahakaran et al. |
| 8,407,434 B2 | 3/2013 | Ogus et al. |
| 9,298,723 B1* | 3/2016 | Vincent ............ G06F 17/30156 |

(Continued)

OTHER PUBLICATIONS

Speer et al, U.S. Appl. No. 13/567,484, entitled "System and Method for Maintaining Cache Coherency", filed Aug. 6, 2012, 53 pages.

*Primary Examiner* — Yong Choe
*Assistant Examiner* — Edward Waddy, Jr.
(74) *Attorney, Agent, or Firm* — Cesari and McKenna, LLP (57) ABSTRACT

A method and system of persistent cache invalidation ensures cache durability. A storage filter driver of a storage input/output (I/O) stack of a server may be used to capture (i.e., track) write requests made to storage devices prior to the persistent cache becoming operational. Entries in the cache having overlapping address ranges with the tracked write requests may be invalidated before the cache is deemed operational. In this manner, the cache remains consistent with the backing store across the administrative actions or failure event (albeit with less valid entries). Notably, the filter driver tracks (i.e., captures) metadata of the write request (i.e., address range and size of the request) to support invalidation of matching cache entries. As such, the filter driver need not store (record) data associated with the write request.

20 Claims, 8 Drawing Sheets

(56) References Cited

U.S. PATENT DOCUMENTS

2008/0301256 A1* 12/2008 McWilliams ....... G06F 12/0284
709/214
2009/0313503 A1* 12/2009 Atluri ................. G06F 11/1453
714/19
2010/0180085 A1* 7/2010 Dave .................... G06F 12/084
711/146
2015/0347310 A1* 12/2015 Ish ........................ G06F 3/0608
711/3

* cited by examiner

METHOD TO PERSISTENT INVALIDATION TO ENSURE CACHE DURABILITY

BACKGROUND

Technical Field

The present disclosure relates to cache durability and, more specifically, to durability of server-side cached data across failure events and administrative actions.

Background Information

A server system typically is connected to one or more storage devices into which information may be entered, and from which information (e.g., data) may be obtained, as desired. The server system may logically organize the information stored on the devices as storage containers, such as files or logical units (LUNs). Typically, one or more applications may execute on the server system to access the information (data) in the storage containers.

To improve performance, the server system may also store the data accessed (i.e., retrieved) by the applications from the storage containers in a cache, where the storage devices may act as a backing store for the cache. During data retrieval, the cache may reach a steady state (i.e., rendered "warm") once a working set of the data has been accessed by the applications from the storage containers. The time to achieve a warm cache may take hours or even days depending on the data access pattern, i.e., input/output (I/O) workload of the applications. A warm cache typically results in improved I/O performance due to high cache hit rates. Thus, it is advantageous to maintain a warm cache and avoid lengthy re-warming should the cache "cool."

However, a cache is usually purged (i.e., rendered "cold") after an administrative action (e.g., a planned shutdown) or a fault event (e.g., a server system failure and a power failure), typically because of an incoherency (i.e., lack of synchronization) between data in the cache and corresponding data in the backing store. After the administrative action or failure event, the server system may be rebooted and the order in which the storage devices become operational (i.e., drivers loaded) may be unpredictable, such that data may be written to one or more of the storage devices (i.e., storage containers) before the cache is operational. This may render portions of a previously warm cache incoherent with respect to the backing store, i.e., data in the cache may be stale (older) compared to data written to the corresponding storage container. As a result, coherency of a warm cache across administrative actions or failure events is unpredictable after an administrative action or fault event.

Therefore, there is a need to maintain coherency of a warm cache across administrative actions and fault events, especially during reboot of the server system.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The subject matter described here is directed to a method and system of persistent cache invalidation to ensure cache durability. As used herein, a cache is persistent when contents of the cache are synchronized (i.e., coherent) with administrative actions (e.g., shutdown). Furthermore, the cache is durable when the contents of the cache are also synchronized across fault events, such that the durable cache maintains consistency across fault events as well as administrative actions. To that end, the system and method of persistent cache invalidation ensures durability of the cache. Note, a cache is coherent when data contents of the cache deemed as valid are consistent with corresponding data contents of a backing store.

In an aspect of the disclosure, a server of a storage system environment maintains a persistent cache on one or more storage devices having fast access times, such as solid state drives (SSDs), to store and serve application data resident on one or more storage containers of a backing store having one or more storage arrays of disk drives, e.g., storage devices with slower access times as compared to the SSDs. The application (e.g., database) may be long-lived such that the persistent cache may reach a steady state (i.e., becomes warm) after a period of time (e.g., many hours). Illustratively, coherency between data in the warm persistent cache and corresponding data in the backing store may be maintained in a write-thru manner by invalidating entries in the cache, e.g., using an in-memory ("in-core") data structure of the server, corresponding to write requests issued by the application to the backing store. That is, cached data corresponding to an incoming write request may be immediately deemed invalid in-core of the server and the invalidation quickly recorded (i.e., persistently) to SSD by writing one or more invalidate cache entries, while data of the write request may be lazily stored to the backing store.

Illustratively, the invalidate cache entries may be persistently stored to the SSDs as metadata associated with the persistent cache. To maintain durability of the cache during administrative actions and fault events, the invalidate cache entries may be retrieved and processed (i.e., corresponding cache entries are invalidated) so that coherency is maintained between the backing store and the cache. A storage filter driver of a storage input/output (I/O) stack may be used to capture (i.e., track) write requests made to the storage devices during restart (e.g., unorderly reboot) prior to the persistent cache becoming operational. Tracked write requests having overlapping address ranges with one or more entries in the persistent cache may invalidate those cache entries before the cache is deemed operational after, e.g., a fault event and restart of the server. As a result, coherency between the persistent cache and backing store is maintained (albeit with possibly fewer valid entries).

Illustratively, an in-core set of cache invalidate entries may be created from the tracked write requests and processed along with the cache invalidate entries stored on SSD. In this manner, the persistent cache remains consistent with the backing store across the administrative actions or failure events even when an application begins accessing (e.g., writing data) to the backing store prior to the cache becoming operational. Notably, the storage filter driver tracks (i.e., captures) metadata of the write request (e.g., address range and length of data for the request) to support invalidation of matching cache entries. As such, the filter driver need not store (record) data associated with the write request.

DESCRIPTION

A. System Environment

Figure 1:
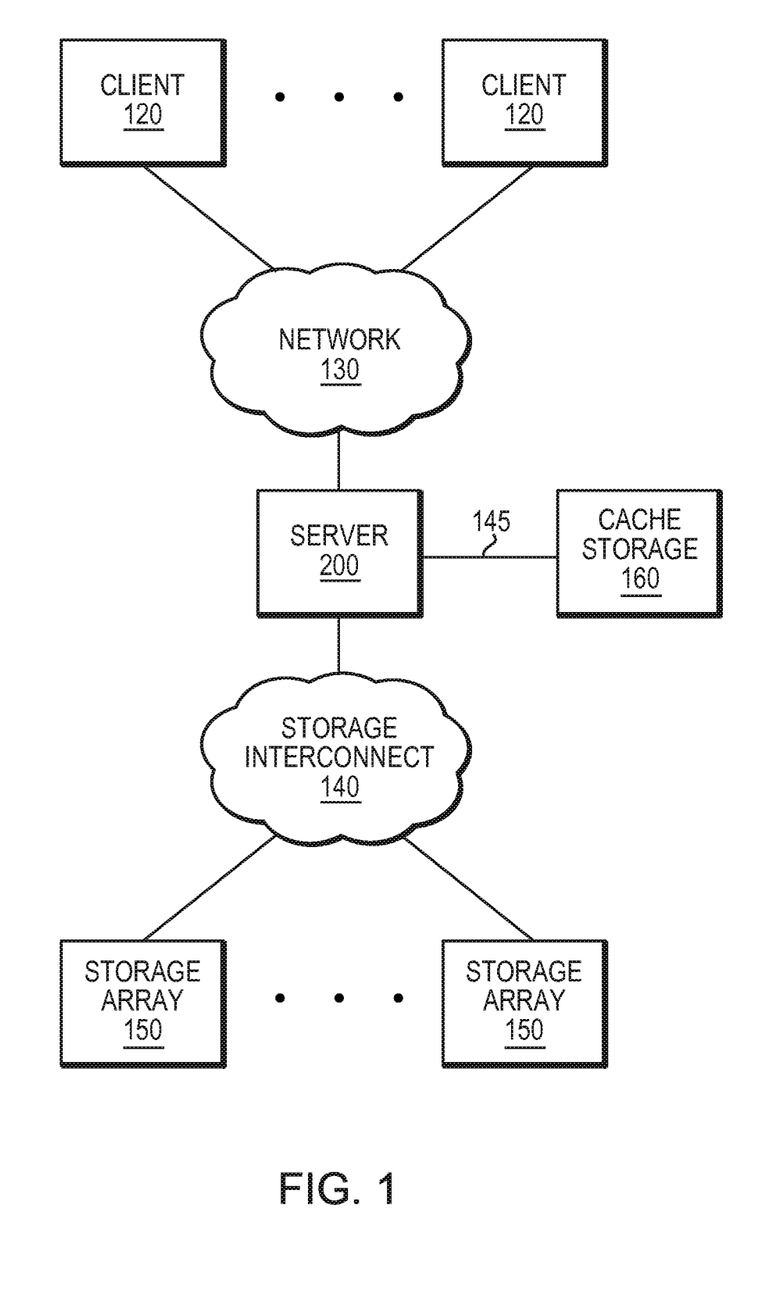
FIG. 1 is a block diagram of a storage system environment.

FIG. 1 is a block diagram of a storage system environment 100 configured to provide information service(s) to one or more clients 120 relating to the organization of information on storage devices. A server 200 of the storage system environment may include functional components that cooperate to provide a storage architecture of the environment 100, which may include a storage area network (SAN). As described herein, the components of the server 200 include hardware and software functionality that enable the server to connect to the one or more clients 120 over a computer network 130, to cache storage 160 over a proximate connection 145 (i.e., nearline storage), as well as to storage devices of storage array 150 over a storage interconnect 140, to thereby render the information service in accordance with the storage architecture.

Each client 120 may be embodied as a general-purpose computer configured to interact with the server 200 in accordance with a client/server model of information delivery. That is, the client may request the services of the server, and the server may return the results of the services requested by the client, by exchanging packets over the network 130. The server may issue packets including file-based access protocols, such as the Network File System (NFS) protocol over the Transmission Control Protocol/Internet Protocol (TCP/IP), when accessing information on the storage devices in the form of storage containers such as files and directories. The server may also issue packets including block-based access protocols, such as the Small Computer Systems Interface (SCSI) protocol encapsulated over TCP (iSCSI) and SCSI encapsulated over Fibre Channel (FCP), when accessing information on the storage devices in the form of storage containers, such as blocks or logical units (LUNs). It should be understood that illustration of storage array 150 as storage devices is solely for ease of depiction and brevity, and that the storage array may be implemented as one or more storage systems providing storage services, e.g., storage containers exported as LUNs, or a file volume connected to the server 200 via the storage interconnect 140. Notably, the server communicates with the cache storage 160 over the proximate connection so as to reduce latency (i.e., nearline storage).

Figure 2:
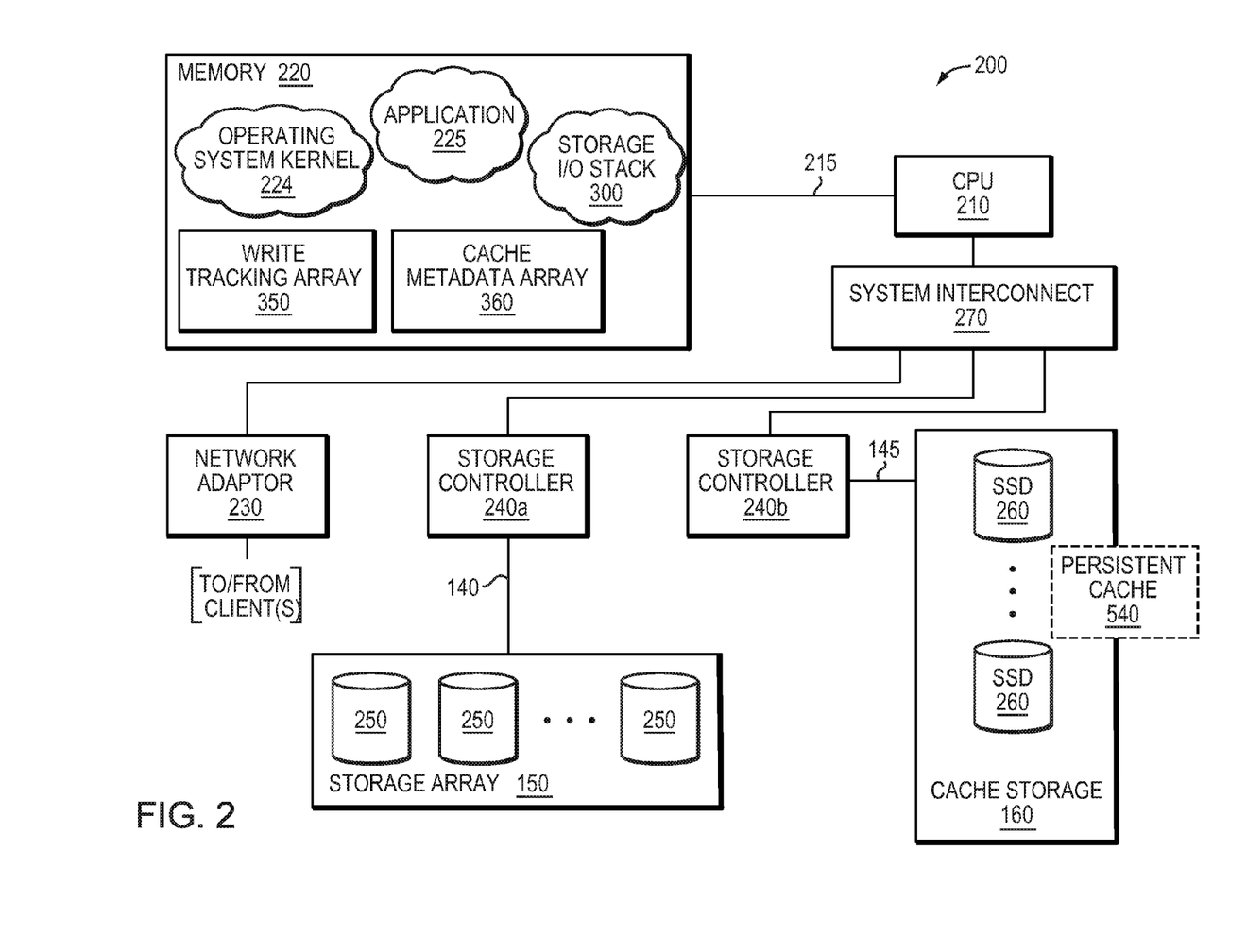
FIG. 2 is a block diagram of a storage system server.

FIG. 2 is a block diagram of a server 200 that is illustratively embodied as a system having one or more central processing units (CPUs) 210 coupled to a memory 220 via a memory bus 215. The CPU 210 is also coupled to a network adapter 230 and storage controllers 240 via a system interconnect 270. The network adapter 230 may include one or more ports adapted to couple the server 200 to the clients(s) 120 over computer network 130, which may include point-to-point links, wide area networks, virtual private networks implemented over a public network (Internet) or a shared local area network. The network adapter 230 thus includes the mechanical, electrical and signaling circuitry needed to connect the server to the network 130, which illustratively embodies an Ethernet or Fibre Channel (FC) network.

The memory 220 may include memory locations that are addressable by the CPU 210 for storing software programs and data structures associated with the disclosure herein. The CPU 210 may, in turn, include processing elements and/or logic circuitry configured to execute the software programs, such as a storage input/output (I/O) stack 300 and application 225, and manipulate the data structures. Illustratively, the storage I/O stack 300 may be implemented as a set of user- and kernel-mode processes that may be decomposed into a plurality of threads. An operating system kernel 224, portions of which are typically resident in memory 220 (in-core) and executed by the processing elements (i.e., CPU 210), functionally organizes the server by, inter alia, invoking operations in support of the information service(s) implemented by the server and, in particular, the application 225 and storage I/O stack 300. A suitable operating system kernel 224 may include a general-purpose operating system, such as the UNIX® series or Linux® series of operating systems, or an operating system with configurable functionality such as microkernels and embedded kernels. However, in an aspect of the disclosure herein, the operating system kernel is illustratively the Microsoft Windows® operating system. It will be apparent to those skilled in the art that other operating system as well as processing and memory means, including various computer readable media, may be used to store and execute program instructions pertaining to the embodiments herein.

A first storage controller 240 may cooperate with the storage I/O stack 300 executing on the server 200 to access information (i.e., data) requested by the application 225 (e.g., a large database). The information may be stored on storage devices 250 (e.g., magnetic hard disk drives, HDDs) within the storage array 150. To enhance performance of the application, a second storage controller 240 may cooperate with the storage I/O stack 300 to access a persistent cache 540 employed to store (cache) the information on storage devices, such as solid state drives (SSDs) 260, having faster access times than the HDDs. Illustratively, the SSDs 260 may be embodied as flash storage devices based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the disclosure herein. Accordingly, the storage devices may or may not be block-oriented (i.e., accessed as blocks). Each of the first and second storage controllers includes one or more ports having I/O interface circuitry that couples to the HDDs 250 or SSDs 260 over the storage interconnect 140, illustratively embodied as a serial attached SCSI (SAS) topology. Alternatively, other point-to-point I/O interconnect arrangements may be used, such as a serial ATA (SATA) topology or a PCI topology.

To facilitate operation of the persistent cache, the memory 220 may include a first data structure, such as cache metadata array 360, to maintain coherency (i.e., ensure persistence) between the cached information (i.e., data) on the SSDs 260 and data on the storage devices 250. In addition, to support durability, the memory may also include a second data structure, such as write tracking array 350, to capture write operations during an administrative action (e.g., orderly shutdown) or fault event (e.g., server failure).

B. Storage Stack

Figure 3:
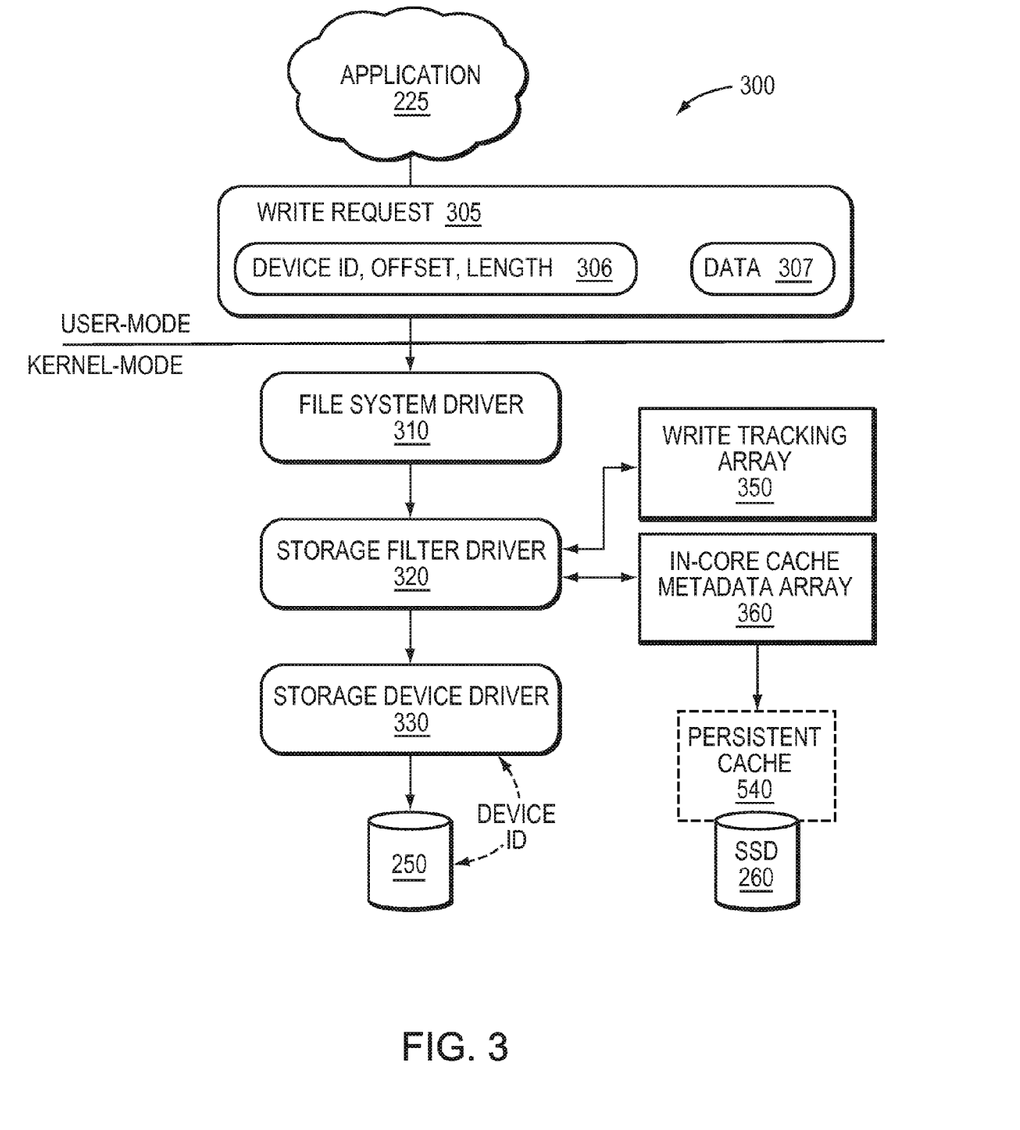
FIG. 3 is a block diagram of storage I/O stack.

FIG. 3 is a block diagram of the storage I/O stack 300 that may be advantageously used with the disclosure herein. The storage I/O stack 300 includes a plurality of software modules or layers that cooperate with the application 225 and other functional components of the server 200 to provide the storage architecture of the storage system environment 100. In an aspect of the disclosure, the storage architecture presents an abstraction of the storage container(s), e.g., LUNs, as portion(s) of the storage array 150 of the server 200 for storage of information (i.e., data) by the application executing on the server. The storage I/O stack cooperates with the SSDs of the persistent cache 540 to enhance (i.e., accelerate) data access performance to the storage container(s) for the application.

Illustratively, the application 225 (e.g., a user-mode process) may issue a write request 305 to the storage container (e.g., storage device or LUN) on the storage devices 250 of the storage array 150. The write request may include metadata 306 such as device identifier (ID), offset and length, as well as (write) data 307. As used herein, a write request may include any data access command which modifies data. The write request may be processed by the storage I/O stack 300, which includes a series of kernel-mode processes or modules that cooperate to store the data 307 to a storage container (e.g., storage device or LUN) identified in the metadata 306. Illustratively, the storage I/O stack modules include a file system driver 310, a storage filter driver 320, and a storage device driver 330 interconnected with messaging services (not shown) provided by the operating system kernel 224. The messaging services may provide a message-based (or event-based) scheduling model (e.g., asynchronous scheduling) that employs messages as fundamental units of work exchanged (i.e., passed) among the modules (e.g., I/O Request Packets, IRPs, used by the Windows® operating system). That is, the messaging services may carry (e.g., as an IRP) the metadata 306 and data 307 of the write request 305 from the file system driver 310 to the storage filter driver 320 and on to the storage device driver 330.

In an aspect of the disclosure, the storage filter driver 320 may cooperate with the cache metadata array 360 to maintain coherency (i.e., ensure persistence) between the persistent cache 540 (i.e., data) on the SSDs 260 and data on the storage container(s) (i.e., HDDs 250 or LUNs). The cache metadata array 360 illustratively maintains in-core status information of the validity of cached data in the persistent cache 540. To ensure persistence (i.e., maintain coherency) of the cache, the in-core information in cache metadata array 360 is stored persistently to the persistent cache 540 on SSD 260. That is, status as to the validity of data in the persistent cache 540 is itself stored persistently in the cache 540 so that coherency of the cache is maintained across administrative actions (e.g., server shutdown) and fault events (e.g., unexpected server failure, such as crash of the operating system). Notably, the storage filter driver 320 may be inserted in the storage I/O stack 300 to operate as a pass-thru module (with respect to the application) for the write request to store data in the storage container. Accordingly, storage semantics of the storage I/O stack 300 for the write data 307 to the backing store (i.e., storage container) may be preserved.

To ensure durability of the persistent cache across fault events, the storage filter driver 320 cooperates with the in-core write tracking array 350 to track (i.e., capture) the metadata 306 of write request 305 within the array 350 when the cache is administratively enabled, but not operational. When restarted (e.g., rebooted) after an administrative action or failure event, some server operating systems, such as Windows®, have an unpredictable order in which storage devices become operational (i.e., drivers loaded) such that the application may issue a write request to the storage container (e.g., LUN) before the persistent cache is operational. This may render portions of a previously warm persistent cache on SSD incoherent with respect to the storage container once the data of the write request is stored. That is, data in the cache may be stale (older) compared to data written to the corresponding storage container (i.e., HDD 250).

Illustratively, the storage filter driver 320 of the storage I/O stack 300 may be used to capture (i.e., track) write requests issued to the storage devices during restart prior to the persistent cache becoming operational. Tracked write requests having overlapping address ranges with one or more entries in the persistent cache 540 may invalidate those cache entries before the cache is deemed operational after, e.g., a fault event and restart of the server. Notably, data 307 of write request 305 need not be tracked in the write tracking array 350, because coherency between the cache and storage container (i.e., backing store) may be maintained by invalidating data in the persistent cache that is inconsistent between the cache and storage container. As a result, coherency between the persistent cache and backing store is maintained (albeit with possibly fewer valid entries).

As noted, a warm cache typically results in improved I/O performance due to high cache hit rates. Thus, it is advantageous to maintain a warm cache and avoid lengthy re-warming should large portions (or the whole) of the cache become inconsistent (i.e., invalid) after an administrative action or fault event. When an application expects that the cache is active (i.e., administratively enabled) by issuing a write request to the storage container, coherency of the write request data with the persistent cache may be maintained so as to preserve a steady state (i.e., warmth) of the cache that may be achieved over a long period of time (e.g., many hours). For example, a large database application may require 12 hours to achieve a cache steady state (i.e., warm cache).

Figure 4:
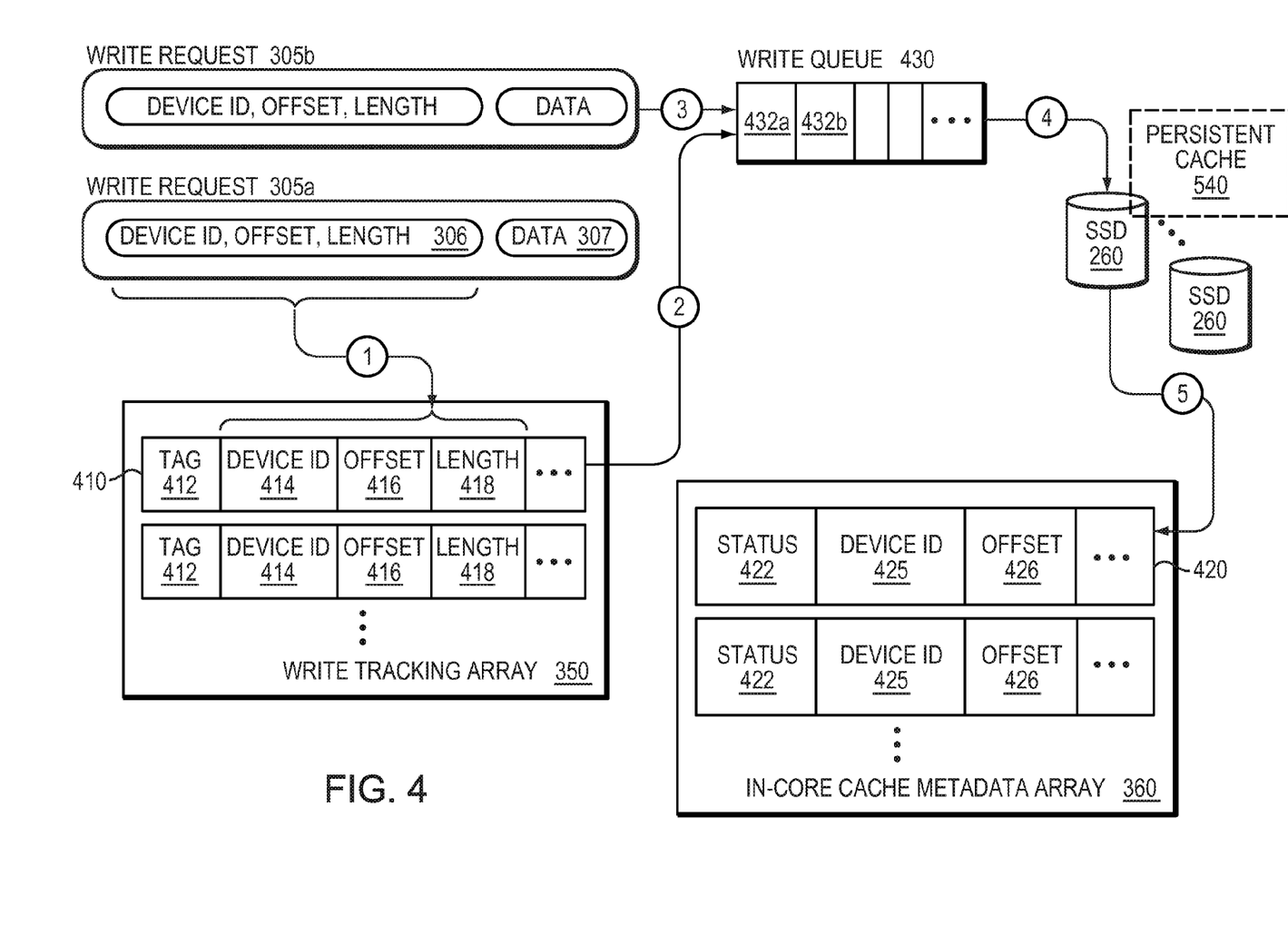
FIG. 4 illustrates a persistent cache configured to ensure durability.

FIG. 4 illustrates the persistent cache configured to ensure durability. During an administrative action or fault event, the persistent cache may be non-operational, but nevertheless administratively enabled such that the write request 305a may be issued by application 225. The storage filter driver 320 may use the write tracking array 350 to track the metadata 306 of the write request 305a (as denoted by circled number 1). Illustratively, the write tracking array 350 has a set of entries 410 (cache invalidate entries), each corresponding to a write request directed to one of the storage containers being cached. Each entry 410 may be used to invalidate data in the persistent cache so as to maintain cache coherency. To that end, each entry 410 of write tracking array 350 includes a tag 412; a device ID 414 corresponding to the storage container (e.g., storage device 250 or LUN); an offset 416 corresponding the OFFSET metadata parameter of the associated write request; and a length 418 corresponding to the LENGTH metadata parameter of the associated write request. As denoted by circled number 2, each entry 410 ("invalidate cache metadata entry") of the write tracking array 350 may be loaded (queued) to a write queue 430 (e.g., entry 432a) for subsequent storage in the persistent cache 540. Once the cache is operational, write request 305b may be queued (e.g., entry 432b) directly to the write queue 430 for storage in the persistent cache 540 (as denoted by circled number 3).

In an aspect of the disclosure, the in-core cache metadata array 360 may be used to provide rapid lookup of cache data. Illustratively, the cache metadata array 360 includes a set of metadata entries 420 corresponding (i.e., one-to-one) to storage blocks on the storage container (e.g., 4 KB), wherein the entries 420 represent storage blocks of uniform size (e.g., 4 KB) and may correspond to logically contiguous regions on the cache storage (e.g., 8 KB, 16 KB, 32 KB blocks on SSD 260). Each metadata entry 420 of the cache metadata array 360 includes a status 422 indicating validity of cache data corresponding to the entry; a device ID 425 corresponding to the storage container (e.g., storage device 250 or LUN); and an offset 426 indicating an offset in the SSD 260 (i.e., having device ID 425) where the cache data for the entry may be retrieved.

Illustratively, the cache invalidate entries 410 may be read from the persistent cache 540 and applied to the in-core cache metadata array 360 to invalidate entries 420 (as denoted by circles number 5). That is, the status 422 of metadata entries 420 in the in-core cache metadata array 360 corresponding to cache invalidate entries 410 recorded in the persistent cache may be modified to indicate the metadata entries 420 are invalid. In this manner, the cache coherency and durability may be maintained.

C. Persistent Cache Layout

Figure 5:
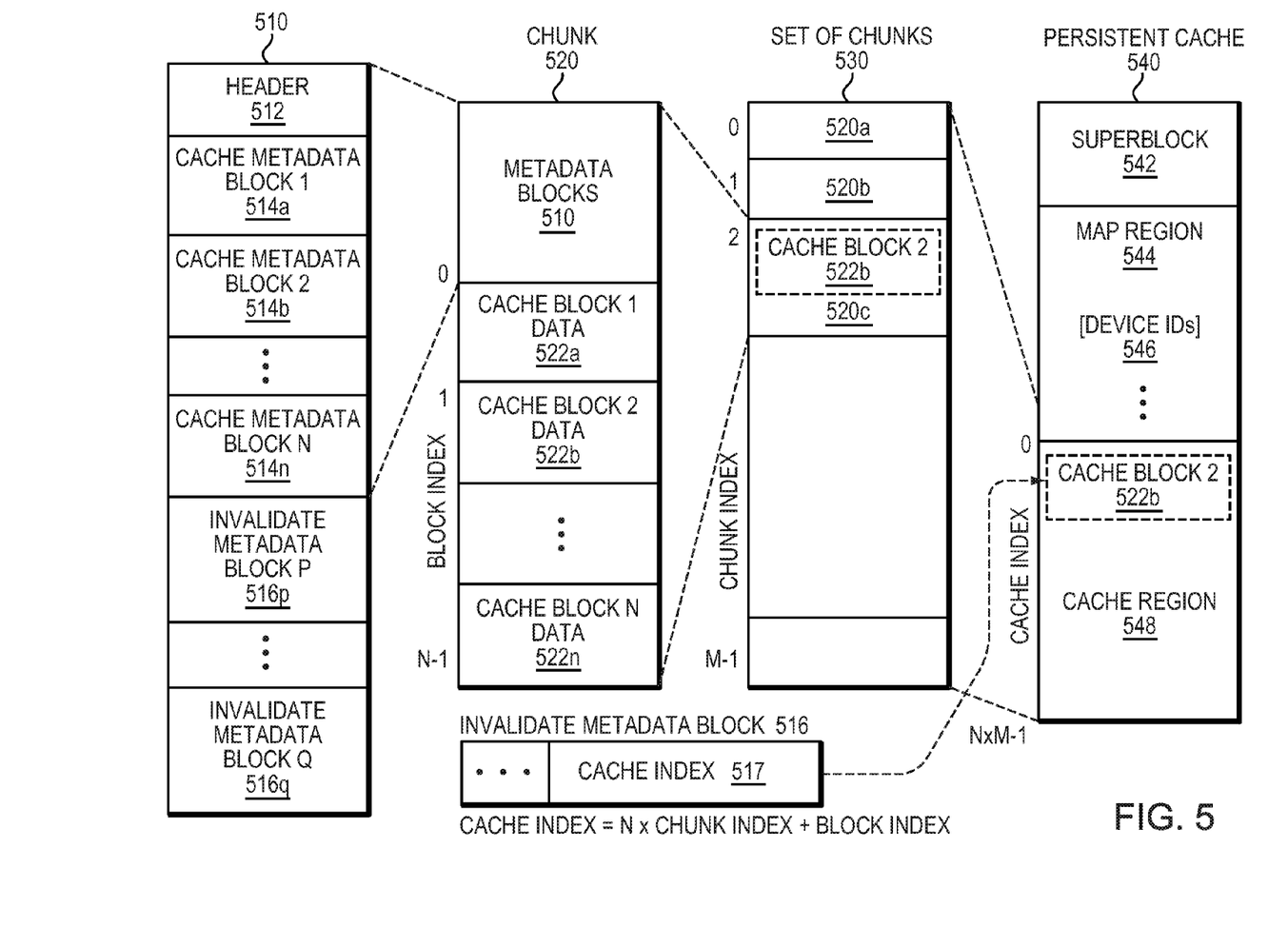
FIG. 5 illustrates a layer of the persistent cache.

FIG. 5 illustrates a layout of the persistent cache. Illustratively, the persistent cache 540 includes a superblock 542 having a durability flag (not shown); a map region 544 including an array of device IDs 546 for the storage devices 150 having the storage containers being cached; and a cache region 548. The cache region 548 includes a set of M chunks 520a-m (having chunk index 0 through M−1). Each chunk 520 further includes metadata blocks 510 and a set of N cache data blocks 522a-n (having block index 0 through N−1) configured to store persistent cache data retrieved from the cached storage containers. The metadata blocks 510 include a chunk header 512 followed by N cache metadata block entries 514a-n associated respectively with each cache data block 522 and a set of invalidate metadata block entries 516p-q. Note, metadata block entries 514 correspond to the in-core metadata entries 420. Similarly, the invalidate metadata block entries 516 correspond to the cache invalidate entries 410. Each invalidate metadata block entry 516 includes a cache index 517 formed from a combination of a chunk index and a block index to enable indexing (i.e., referencing) of a cache data block 522 in the cache region 548 as a cache index, i.e., indexing the cache data block 522 within the set of chunks 530, illustratively expressed as N×chunk index+block index. For example, to invalidate a second cache block (block index 1) 522b of a third chunk (chunk index 2), an invalidate metadata block entry 516 may contain a cache index 129 (=64×2+1) indicating that the 130$^{th}$ cache data block 522 of the cache region 548 is invalid.

In an aspect of the disclosure, the chunk header 512 may also include a checksum field (not shown); a scan size (not shown) indicating a size in bytes of the metadata blocks 510 and a generation ID (not shown) indicating a sequence number of the chunk 520. In addition, each cache metadata block entry 514 may have a device ID and a cache block fingerprint (not shown) as well as cache block usage information, e.g., last access time, number of accesses (not shown).

In an aspect of the disclosure, the cache region 548 data may be organized as a circular log (e.g., an array) of cache data blocks 522 of fixed size (e.g., 4 KB). A cache replacement algorithm (such as least recently used) may move incrementally from block to block (e.g., block 0 to block 1) and wrap at block N back to block zero. The number of cache blocks N in a chunk 520 may be chosen such that a size of the chunk (N×4 KB) is equal to an efficient write size (e.g., an internal block size such as an erase block) of the SSD 260, i.e., the chunk may be aligned to the efficient write size of the SSD. For example, N=64 yields a chunk size of 256 KB (64×4 KB).

D. Persistent Cache

In an aspect of the disclosure, persistent invalidation of cache data may occur when an application (such as application 225) issues a write request that modifies data in the backing store (i.e., storage container). If a copy of data modified by the write request resides in the persistent cache 540 (i.e., on SSD 260), the corresponding cache entry (i.e., cache data block) is invalidated prior to modifying the data in the backing store (i.e., completing the write request) to thereby ensure persistence of the cache. Further, the invalidation (i.e., invalidate metadata block entry 516) may be stored in the persistent cache 540 to ensure durability across fault events, such as a power failure or operating system crash.

Figure 6A:
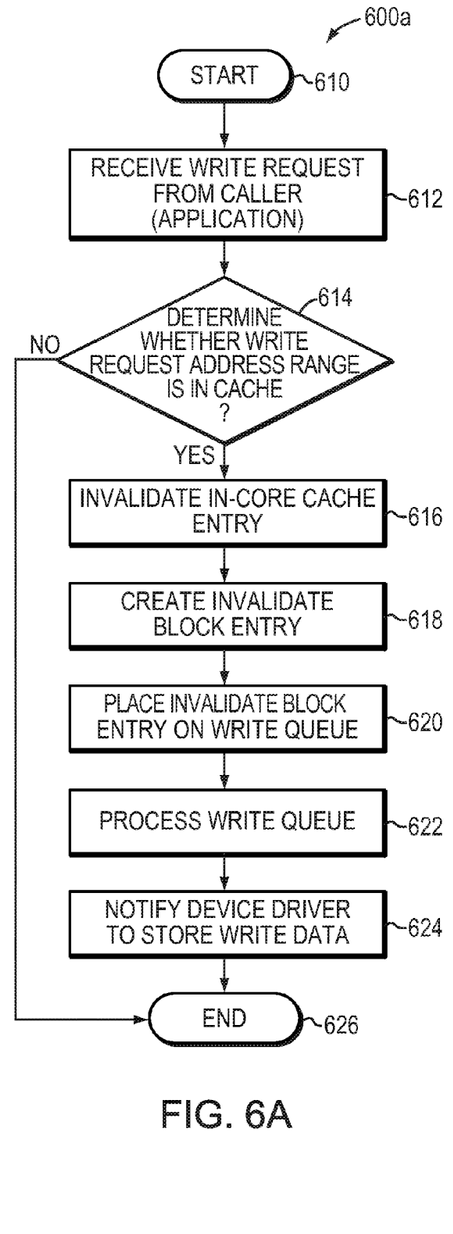
FIG. 6a is an example simplified procedure for invalidating cache entries.

FIG. 6a is an example simplified procedure for invalidating cache entries in accordance with the disclosure herein. The procedure 600a starts at step 610 and continues to step 612 where a write request issued from the application (caller) is received by the storage filter driver. At step 614, a determination is made whether the data modified by the write request is resident in the cache, e.g., whether the device ID and address range (offset and length) of the metadata of the write request overlap one or more entries in the in-core cache metadata array. If not, the data is not in the cache and the procedure ends at step 626. If one or more entries overlap the write request, then the overlapping entries of the in-core cache metadata array are invalidated (i.e., status flag 422 is modified to record the associated entry as invalid) at step 616. At step 618 an cache invalidate entry is created corresponding to the cache block indexed by the invalidate metadata block entry at step 616. The cache invalidate entry is placed on the write queue at step 620 for storage in the persistent cache. At step 622 the write queue is processed. Once the cache invalidate entry is stored, the storage device driver may be notified to proceed with the storage of the data of the write request in the storage container at step 624. The procedure ends at step 626.

Figure 6B:
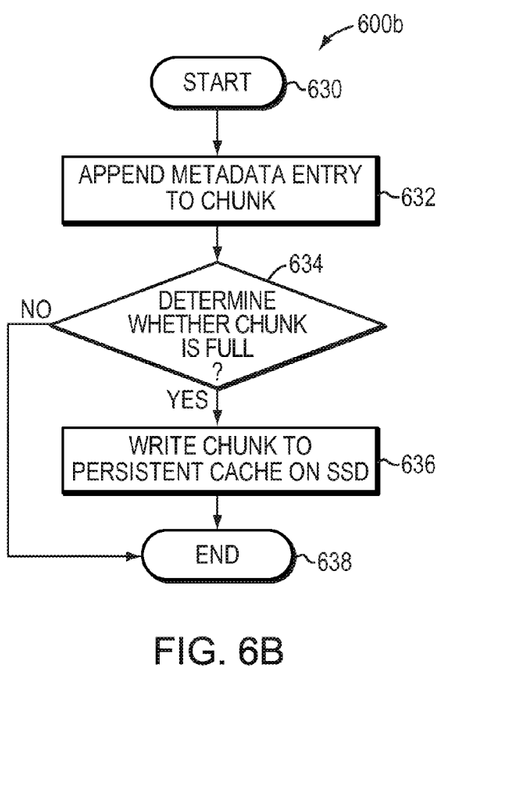
FIG. 6b is an example simplified procedure for persistently storing cache invalidate entries.

Illustratively, the write queue may be processed by accumulating the metadata entries of the write queue in-core as persistent cache chunks prior to storage on SSD. FIG. 6b is an example simplified procedure 600b for persistently storing the cache invalidate entries in accordance with the disclosure herein. The procedure 600b starts at step 630 and continues to step 632 where metadata entries in the write queue are appended to an in-core buffer having the size of the chunk. At step 634 a determination is made whether the in-core buffer is full (i.e., chunk full). If the buffer is not full, the procedure ends at step 638. If the buffer (chunk) is full, then the buffer is written as a chunk to the persistent cache on SSD at step 636. The procedure then ends at step 638.

E. Durable Cache

As noted, a durable cache permits the server to maintain consistent performance across administrative actions and fault events. For example, maintaining a warm cache (i.e., durable cache) on restart allows the administrator to install system updates and perform maintenance without adversely affecting application performance (i.e., no cache re-warming is required).

Figure 7:
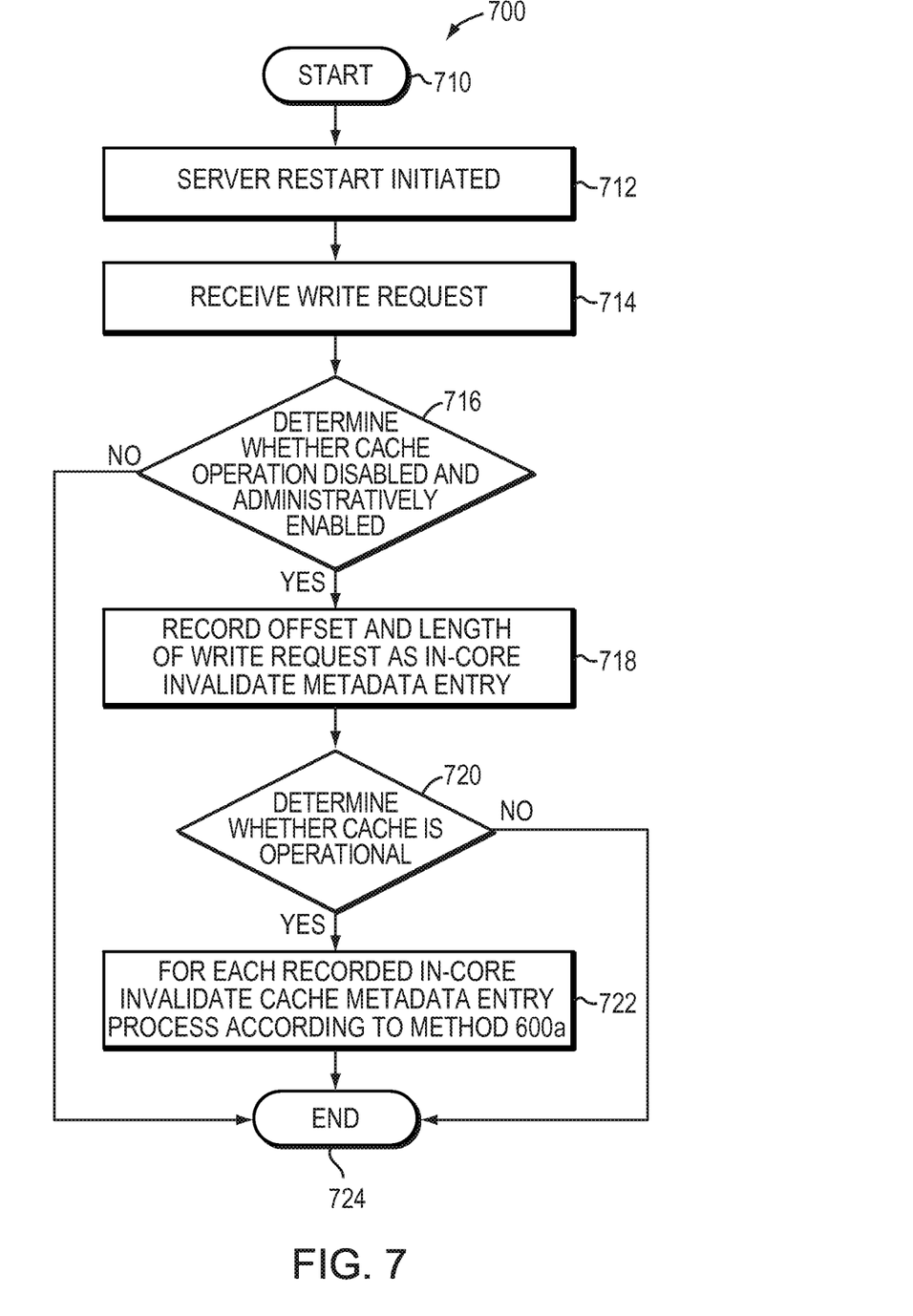
FIG. 7 is an example simplified procedure for invalidating cache/block entries after an administrative action or fault event.

FIG. 7 is an example simplified procedure for invalidating cache entries after an administrative action or fault event in accordance with the disclosure herein. The procedure 700 starts at step 710 and continues to step 712 where the server is restarted (e.g., unorderly rebooted) after an administrative action or failure event. At step 714 the storage filter driver receives a write request and, at step 716, a determination is made whether the cache is operationally disabled (i.e., not yet "up" after the restart) and administratively enabled (i.e., the application issues a write request to modify data in backing store). If the cache is operational or administratively disabled, then the procedure ends at step 724. If the cache is not operational, but administratively enabled, then the procedure continues at step 718 where a cache invalidate entry 410 is recorded in the write tracking array based on the offset and length metadata of the write request. At step 720, a determination is made whether the cache is operational. If the cache is operational, then the cache invalidate entries of the in-core write tracking array are processed at step 722. That is, the tracked (i.e., captured) cache invalidate entries of the write tracking array are processed (i.e., yielding invalidate block entries to invalidate cache blocks for corresponding write requests) as if write requests are received when the persistent cache is operational. The procedure then ends at step 724.

Figure 8:
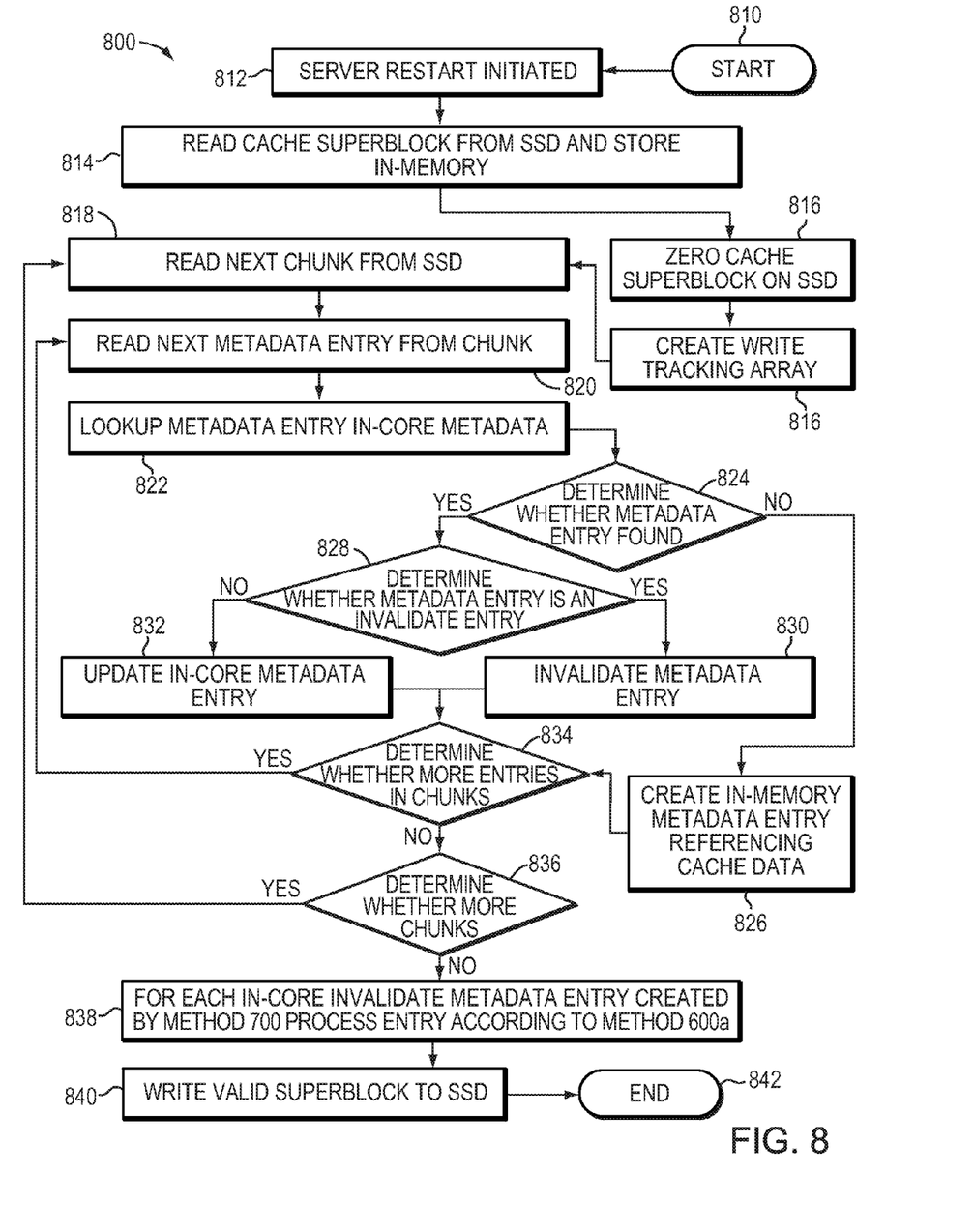
FIG. 8 is an example simplified procedure for ensuring cache durability after an administrative action or fault event.

FIG. 8 is an example simplified procedure for ensuring cache durability after an administrative action or fault event by, e.g., recovering the durable cache and reloading the in-core cache metadata array after the administrative action or fault event while ensuring durability during server restart. The procedure 800 starts at step 810 and continues to step 812 where the server is restarted after the administrative action or failure event. At step 814 the super block of the cache is read and stored in-core (in memory). At step 816, the durability flag of the superblock is cleared (e.g., zeroed) on the storage device (i.e., SSD) of the persistent cache indicating the state of cache is not durable and, at step 816, the write tracking array is created. At step 818 a chunk from the persistent cache on SSD is read. A cache metadata block entry (i.e., cache metadata block or invalidate metadata block) is read from the chunk at step 820. The cache metadata block entry is looked up in the in-core cache metadata array at step 822 and, at step 824, a determination is made whether the entry is found. If the entry is not found in the in-core cache metadata array, at step 826, a metadata entry is created in the cache metadata array referencing the cache block on SSD (i.e., device ID and offset of data). The procedure then continues to step 834 where the next cache metadata block entry may be read from SSD. If, at step 824, the entry is found to be already in the in-core cache metadata array, then the procedure continues at step 828 where a determination is made as to the type of metadata entry read from SSD. If the entry is a cache metadata block entry, then, at step 832, the in-core metadata entry (i.e., the entry found at step 822) is updated. If the metadata entry read from SSD is an invalidate metadata block entry, then, at step 830, the entry of the in-core metadata array corresponding to the cache block is invalidated. Note, the cache index field 517 of the invalidate metadata block entry references the cache block being invalidated.

The procedure continues at step 834 where a determination is made if more metadata entries exist in the chunk being read from SSD. If another metadata entry exists in the chunk being read, the next entry is read as the procedure loops back to step 820. If no more metadata entries exist in the chunk being read, then a determination is made whether to read the next chunk from SSD (step 836). If another chunk exists, the procedure loops back to step 818 where the next chunk is read from SSD. When no more chunks exist, the procedure continues to step 838, which implements step 722 of procedure 700 in FIG. 7. The cache invalidate entries of the in-core write tracking array are processed according to the procedure previously outlined in FIG. 6a. That is, the tracked (i.e., captured) cache invalidate entries of the write tracking array are processed (i.e., yielding invalidate block entries to invalidate cache blocks for corresponding write requests) as if write requests are received when the persistent cache is operational. At step 840, the superblock may be written to SSD having the durability flag set (i.e., cache is durable) and, at step 842, the procedure ends.

H. Other Embodiments

The foregoing description has been directed to specific aspects of the disclosure. It will be apparent, however, that other variations and modifications may be made to the described implementations, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. For example, the operating system can also be implemented as a microkernel, an application program operating over a general-purpose operating system, such as UNIX® or Windows NT®, or as a general-purpose operating system with configurable functionality, which is configured for applications as described herein.

Furthermore, it will be understood to those skilled in the art that the implementations described herein may apply to any type of special-purpose (e.g., file server, filer or storage serving appliance) or general-purpose computer, including a standalone computer or portion thereof, embodied as or including a storage system. Moreover, the disclosure herein can be adapted to a variety of system environments including, but not limited to, a network-attached storage environment, a storage area network and disk assembly directly-attached to a client computer.

Those of skill in the art would further appreciate that the various illustrative modules, algorithms and method steps of implementations described herein may be implemented as computer electronic hardware, computer software, or combinations of both to obtain a given functionality. Illustratively, interchangeability of hardware and software may be made to obtain the same functionality. Skilled artisans may implement the described functionality in varying ways, but such design choices should not be interpreted as causing departure from the implementations described herein.

Accordingly this description is to be taken only by way of example and not to otherwise limit the scope of the aspects of the disclosure. Therefore, it is the object of the appended claims to cover all such variations and modifications as come within the true spirit and scope of the subject matter.

What is claimed is:

1. A method comprising:
receiving a first write request directed to a first logical unit (LUN) connected to a server having a memory, the first write request having data, a first offset and a first length representing a first address range;
matching the first address range to a first entry of an in-core metadata array, each entry of the metadata array indexing a cache block on a second LUN, the cache block on the second LUN copied from the first LUN, the second LUN connected to the server;
storing on the second LUN a cache metadata block entry of a persistent cache, the cache metadata block entry having a number of accesses of the cache block, the cache metadata block entry indexing the cache block on the second LUN;
invalidating the matching first entry of the in-core metadata array; and
storing on the second LUN a first invalidate block entry of the persistent cache, the first invalidate block entry indexing the cache block on the second LUN, the first invalidate block entry invalidating the cache metadata block entry.

2. The method of claim 1 further comprising:
appending the first invalidate block entry to an in-core chunk; and
storing the chunk to the second LUN, a size of the chunk aligned to an internal block size of a storage device storing the second LUN.

3. The method of claim 1 wherein the first LUN is stored on a first storage device and the second LUN is stored on a second storage device, and wherein the second storage device has a faster access time than that of the first storage device.

4. The method of claim 1 further comprising:
receiving a second write request directed to the first LUN, a second offset and second length representing a second address range;
determining whether the second LUN is operational; and
in response to determining that the second LUN is not operational, recording the second address range to an in-core write tracking data structure.

5. The method of claim 4 further comprising:
in response to determining that the second LUN is operational, creating a second invalidate block entry having the second address range;
matching the second address range to a second entry of the in-core metadata array; and
invalidating the matching second entry of the in-core metadata array.

6. The method of claim 4 wherein the server is restarted.

7. The method of claim 5 wherein the second invalidate block entry is stored on the second LUN.

8. The method of claim 1 further comprising:
in response to restarting of the server, reading the first invalidate block entry from the second LUN;
reading the cache metadata block entry from the second LUN;
creating a second entry of the in-core metadata array from the cache metadata block entry, the second entry corresponding to the cache block;
determining whether the first invalidate block entry is found in the in-core metadata array; and
in response to determining that the first invalidate block entry is not found in the in-core metadata array, invalidating the second entry of the in-core metadata array.

9. The method of claim 8 further comprising:
clearing a flag stored on the second LUN, the flag indicating durability of the first invalidate block entry stored on the second LUN.

10. The method of claim 1 further comprising:
maintaining on the second LUN a device identifier of a storage device storing the first LUN.

11. A system comprising:
a server having a central processing unit (CPU);
a memory coupled to the CPU and configured to store one or more processes executable by the CPU, the one or more processes configured to:
receive a first write request directed to first logical unit (LUN) connected to the server, the first write request having data, a first offset and a first length representing a first address range;
match the first address range to a first entry of an in-core metadata array, each entry of the metadata array indexing a cache block on a second LUN, the cache block on the second LUN copied from the first LUN, the second LUN connected to the server;
store on the second LUN a cache metadata block entry of a persistent cache, the cache metadata block entry having a number of accesses of the cache block, the cache metadata block entry indexing the cache block on the second LUN;
invalidate the matching first entry of the in-core metadata array; and
store on the second LUN a first invalidate block entry of the persistent cache, the first invalidate block entry indexing the cache block on the second LUN, the first invalidate block entry invalidating the cache metadata block entry.

12. The system of claim 11 wherein the one or more processes are further configured to:
append the first invalidate block entry to an in-core chunk; and
store the chunk to the second LUN, a size of the chunk aligned to an erase block size of a storage device storing the second LUN.

13. The system of claim 11 wherein the first LUN is stored on Ea first storage device and the second LUN is stored on a second storage device, and wherein the second storage device has a faster access time than that of the first storage device.

14. The system of claim 11 wherein the one or more processes are further configured to:
receive a second write request directed to the first LUN, a second offset and second length representing a second address range;
determine whether the second LUN is operational; and
in response to determining that the second LUN is not operational, record the second address range to an in-core write tracking data structure.

15. The system of claim 14 wherein the one or more processes are further configured to:
in response to determining that the second LUN is operational, create a second invalidate block entry having the second address range;
match the second address range to a second entry of the in-core metadata array; and
invalidate the matching second entry of the in-core metadata array.

16. The system of claim 11 wherein the server is restarted.

17. The system of claim 15 wherein the second invalidate block entry is stored on the second LUN.

18. The system of claim 11 wherein the one or more processes are further configured to:
in response to restarting of the server, read the first invalidate block entry from the second LUN;
read the cache metadata block entry of the persistent cache from the second LUN;
create a second entry of the in-core metadata array from the cache metadata block entry, the second entry corresponding to the cache block;

determine whether the first invalidate block entry is found in the in-core metadata array; and in response to determine that the first invalidate block entry is not found in the in-core metadata array, invalidate the second entry of the in-core metadata array.

19. The system of claim 11 wherein the one or more processes are further configured to:

maintain on the second LUN a device identifier of a storage device storing the first LUN.

20. A non-transitory computer readable medium including program instructions for execution on one or more processors, the program instructions configured to:

receive a write request directed to first logical unit (LUN) connected to a server having a memory, the write request having data, an offset and a length representing an address range;

match the address range to an entry of an in-core metadata array, each entry of the metadata array indexing a cache block on a second LUN, the cache block on the second LUN copied from the first LUN, the second LUN connected to the server;

store on the second LUN a cache metadata block entry of a persistent cache, the cache metadata block entry having a number of accesses of the cache block, the cache metadata block entry indexing the cache block on the second LUN;

invalidate the matching entry of the in-core metadata array; and store on the second LUN an invalidate block entry of the persistent cache, the invalidate block entry indexing the cache block on the second LUN, the invalidate block entry invalidating the cache metadata block entry.

* * * * *

UNITED STATES PATENT AND TRADEMARK OFFICE
CERTIFICATE OF CORRECTION

PATENT NO.         : 9,514,054 B2                                   Page 1 of 1
APPLICATION NO.    : 14/326210
DATED              : December 6, 2016
INVENTOR(S)        : Kenny Speer et al.

It is certified that error appears in the above-identified patent and that said Letters Patent is hereby corrected as shown below:

In the Claims

Claim 13, Column 12, Line 34 reads:
on Ea first storage device and the second LUN is stored on Should read:
on a first storage device and the second LUN is stored on Signed and Sealed this
Ninth Day of May, 2017

Michelle K. Lee
*Director of the United States Patent and Trademark Office*